US006092891A

United States Patent [19]

Okubo et al.

[11] Patent Number: 6,092,891

[45] Date of Patent: Jul. 25, 2000

[54] FIXING MECHANISM AND INK JET RECORDING APPARATUS USING THE FIXING MECHANISM

[75] Inventors: Akio Okubo, Tokyo; Atsushi Saito, Yokohama; Yasuhiko Ikeda, Sagamihara, all of Japan

[73] Assignee: Canon Kabushiki Kaisha, Tokyo, Japan

[21] Appl. No.: 08/304,435

[22] Filed: Sep. 12, 1994

Related U.S. Application Data

[63] Continuation of application No. 07/798,949, Nov. 27, 1991, abandoned.

[30] Foreign Application Priority Data

| | | | |
|---|---|---|---|
| Nov. 30, 1990 | [JP] | Japan | 2-329521 |
| Nov. 30, 1990 | [JP] | Japan | 2-329522 |
| Oct. 18, 1991 | [JP] | Japan | 3-271378 |

[51] Int. Cl.[7] ..... B41J 2/01; G01D 9/00; H05B 1/00; B41F 23/04

[52] U.S. Cl. ..... 347/104; 346/25; 219/216; 101/487

[58] Field of Search ..... 346/25; 347/102, 347/104; 101/416.1, 487, 488, 424.1; 219/216; 355/285; 400/627; 271/276; 399/251, 328

[56] References Cited

U.S. PATENT DOCUMENTS

| | | | |
|---|---|---|---|
| 4,285,507 | 8/1981 | Marinoff | 271/276 X |
| 4,313,124 | 1/1982 | Hara | 346/140 R |
| 4,317,026 | 2/1982 | Koblo et al. | 219/216 |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,469,026 | 9/1984 | Irwin | 347/102 X |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,865,675 | 9/1989 | Yamamoto et al. | 156/164 |
| 4,933,684 | 6/1990 | Tasaki et al. | 347/102 X |
| 4,973,824 | 11/1990 | Ohashi et al. | 219/216 |
| 5,005,025 | 4/1991 | Miyakawa et al. | 346/25 |
| 5,020,244 | 6/1991 | Smith | 347/102 X |
| 5,041,846 | 8/1991 | Vincent et al. | 346/25 |

FOREIGN PATENT DOCUMENTS

| | | | |
|---|---|---|---|
| 0125581 | 11/1984 | European Pat. Off. . | |
| 0551288 | 7/1993 | European Pat. Off. . | |
| 59-123670 | 7/1984 | Japan . | |
| 59-138461 | 8/1984 | Japan . | |
| 59-209148 | 11/1984 | Japan . | |
| 0035345 | 2/1988 | Japan | 346/140 R |
| 1285352 | 11/1989 | Japan . | |
| 2-187340 | 7/1990 | Japan | 347/102 |
| WO926417 | 4/1992 | WIPO . | |

OTHER PUBLICATIONS

Williams, G.T., "Fusing Apparatus", IBM Technical Disclosure Bulletin vol. 12, No. 2 Jul. 1969, pp. 272–273.

*Primary Examiner*—N. Le
*Assistant Examiner*—Shih-Wen Hsieh
*Attorney, Agent, or Firm*—Fitzpatrick, Cella, Harper & Scinto

[57] ABSTRACT

A fixing mechanism for fixing a ink on a recording medium which is discharged by a recording device includes a first fixing area onto which heat sufficient to fix the ink is applied to the recording medium, a second fixing area which is closer to the recording device than the first fixing area and where a lower heat than the heat applied to the recording medium in the first fixing area is applied to the recording medium, and a conveyor for conveying the recording medium into the second fixing area and conveying it out of the first fixing area.

14 Claims, 15 Drawing Sheets

FIXING MECHANISM AND INK JET RECORDING APPARATUS USING THE FIXING MECHANISM

This application is a continuation of application Ser. No. 07/798,949 filed Nov. 27, 1991, now abandoned.

BACKGROUND OF THE INVENTION

1. Field of the Invention

The present invention relates to a fixing mechanism for fixing the ink discharged onto a recording medium, and an ink jet recording apparatus using the fixing mechanism.

2. Related Background Art

If a recording sheet just recorded with an ink jet recording apparatus, on which the ink has not been completely dried up, is touched, an image may be smeared or the ink may stick to the hands. With the ink jet recording apparatus having a high recording speed, a second recording sheet may be stained on its back face if it is laid over a first recording sheet before the ink of the first recording sheet dries. Therefore, among ink jet recording apparatuses, a high speed recording apparatus having a full-line type recording head requires means for drying and fixing the ink onto a recording sheet.

Especially, in a facsimile apparatus with a short distance from a recording unit to a paper exhaust port, a fixing mechanism is important. As the means for drying and fixing the ink, a thermal fixing method is conventionally used in which a recording sheet just recorded is rapidly heated to a high temperature. In the ink jet recording, it is commonly practiced to dry up all the ink in such a manner as to provide a fixing unit on a back side of a record face of the recording sheet in which a surface heater having a width exceeding that of the recording sheet is placed in contact with an entire surface of the recording sheet, because an image may be spoiled if the record face is rubbed before the ink has not been completely dried up. Besides, other methods are known in which the radiant heat is applied onto the recording sheet from above (Japanese Patent Application No. 59-209148), or the fixing feature is provided on the platen (Japanese Patent Application No. 1-285352).

Among the above-mentioned fixing methods, a generally practiced method in which a plate-like or surface heater is placed in contact with a back side of the recording sheet is carried out in such a manner that the record face is pressed against the surface heater at a very small contact area such as a plurality of points or lines, so that the heat of the surface heater can be efficiently transmitted to the recording sheet.

In the conventional examples as above described, the surface heater is placed in contact with an entire face of the recording sheet, but if the surface heater is disposed to be in contact with a recording sheet just recorded and a high temperature is abruptly applied to thermally fix the ink, in order to make the apparatus smaller, there is a problem that the ink may be dried up before ink droplets can permeate the recording sheet sufficiently, so that the diameter of dot may be smaller. Also, there is a problem that the non-uniformity of density may be produced as the density is partially increased on the upstream side in the conveyance direction (on the side entering a fixing unit from behind). Therefore, it is necessary to dispose the surface heater a certain distance away from the recording section, which impedes the accomplishment of a smaller apparatus.

Further, there is a problem that when a quantity of ink droplets is discharged, wrinkles or non-uniform densities may be produced on the recording sheet if the thermal fixing is made with the abrupt application of a high temperature mediately after recording.

SUMMARY OF THE INVENTION

It is an object of the present invention to provide a fixing mechanism appropriate for a smaller apparatus and an ink jet recording apparatus using said fixing mechanism which does not produce non-uniform densities or wrinkles of the recording sheet, in view of the above-mentioned problems associated with the conventional art.

It is another object of the present invention to provide a fixing mechanism of high speed and high recording quality, and an ink jet recording apparatus using said fixing mechanism.

It is another object of the present invention to provide a fixing mechanism for fixing the ink on a recording medium which is discharged by recording means onto said recording medium, wherein it comprises a first fixing area onto which the heat sufficient to fix the ink is given to the recording medium, a second fixing area which is closer to said recording means than said first fixing area and in which a lower heat than the heat given to said recording medium in said first fixing area is given to said recording medium, and conveying means for conveying said recording medium into said second fixing area, and conveying it out of said first fixing area.

It is another object of the present invention to provide a recording apparatus for recording onto a recording medium by using ink, wherein it comprises recording means for recording by discharging the ink onto the recording medium, a first fixing area in which the heat sufficient to fix the ink is given to said recording medium, a second fixing area which is closer to said recording means than said first fixing area and in which a lower heat than the heat given to said recording medium in said first fixing area is given to said recording medium, and conveying means for conveying said recording medium into said second fixing area, after introducing said recording medium into an area where said recording means is located, and conveying it out of said first fixing area.

DETAILED DESCRIPTION OF THE PREFERRED EMBODIMENT

The examples of the present invention will be described below with reference to the drawings.

First Embodiment

Figure 1:
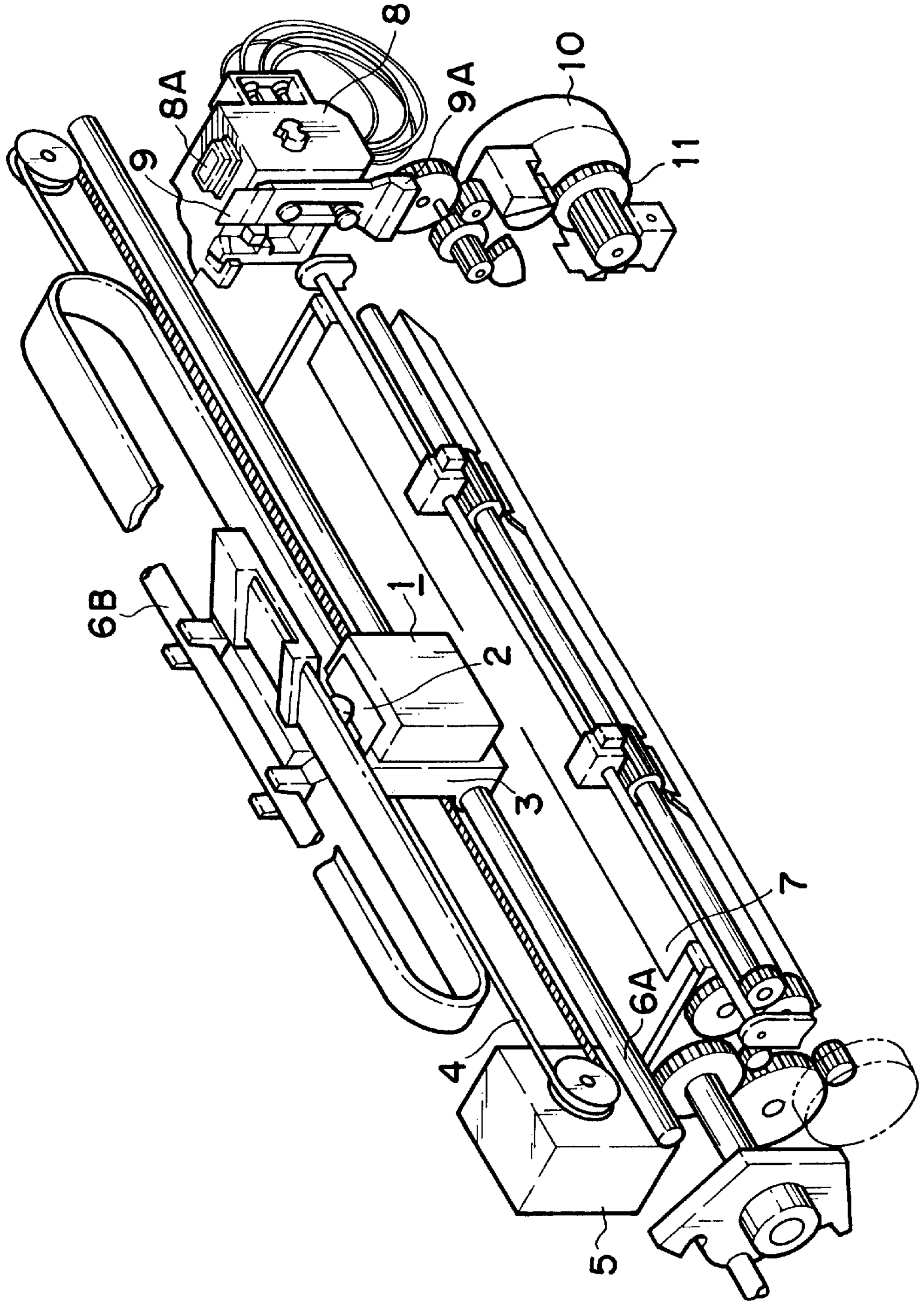
FIG. 1 is a perspective view of essential parts showing one example of an ink jet recording apparatus in the example of the present invention.

First, an ink jet recording apparatus to which an ink drying/fixing mechanism in the example of the present invention is appropriately applied will be described with reference to FIGS. 1 and 2, wherein the ink jet recording apparatus is one having a serial-type recording head here, rather than a full-line recording head. FIG. 1 is a perspective view of essential parts showing one example of the ink let recording apparatus having a fixing mechanism according to the present invention mounted thereon, and FIG. 2 is a perspective view of one example of an ink jet recording head.

Figure 2:
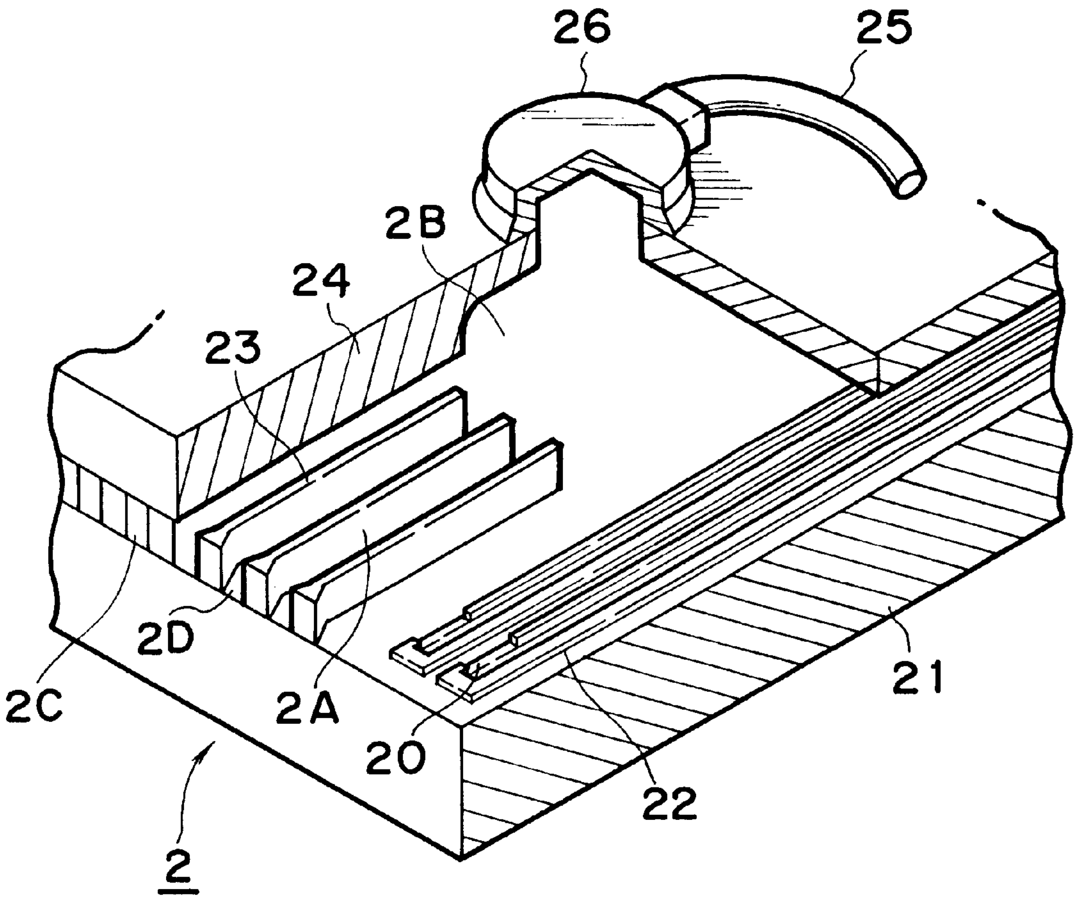
FIG. 2 is a perspective view showing one example of an ink jet recording head.

The ink jet recording apparatus in this embodiment is such that a carriage 3 on which an ink jet cartridge 1 having the ink jet recording head 2 with its discharge port face 2C directed downward and an ink tank, not shown, integrated therewith are mounted is connected to one end of a drive belt 4 for transmitting the driving force of a drive motor 5 and attached slidably on two guide shafts 6A, 6B disposed in parallel to each other, as shown in FIGS. 1 and 2. The ink jet recording head 2 moves in reciprocating motion over an entire width of a recording medium fed from a recording medium feeder, not shown, to a platen 7 disposed opposed to the discharge port face 2C of the ink jet recording head 2, with the driving force of the drive motor 5, in order to make the recording onto the recording medium.

The ink jet recording apparatus in this embodiment is driven via a transmission mechanism 11 by the driving force of a cleaning motor 10, opposed to the discharge port face 2C of the ink jet recording head 2, at a position to which the ink jet recording head 2 is moved in the head recovery operation (in the figure, the right end of guide shaft 6A, thereinafter referred to as "recovery position"), outside of a range of reciprocating motion in the recording operation with the ink jet recording head 2, in which a head recovery unit 8 equipped with a cap member 8A for capping the discharge port face 2C of the ink jet recording head 2 is provided.

This head recovery unit 8 performs a head recovery operation in which the ink is compulsorily discharged through discharge ports 2D to remove thickened ink within discharge ports 2D by sucking the ink with appropriate suction means or forcedly feeding the ink with appropriate pressure means provided in an ink supply passage to the ink jet recording head 2, while capping the discharge port face 2C if the ink jet recording apparatus 2 with a cap member 8A for the head recovery operation.

Further, on a side face of the head recovery unit 8, a blade 9 as a wiping member made of silicone rubber is carried in cantilever form by a blade carrying member 9A, and operates with the cleaning motor 10 and the transmission mechanism 11 in the same way as the head recovery unit 8 so as to be engaged with the discharge port face 2C of the ink jet recording head 2. Thereby, after the head recovery operation using the head recovery unit 8, the blade 9 is protruded onto a travel path of the ink jet recording head 2 to wipe away dewing, wetting or dust on the discharge port face 2C of the ink jet recording head 2 produced by the movement of the ink jet recording head 2.

The above-described ink jet recording apparatus receives the document information input from an input unit such as a keyboard, or data such as control command, in a print control unit, so as to perform a series of recording operations of document information or the head recovery operation.

The recording head 2 uses electricity-heat converters 20 as energy generating means for causing the liquid to be heated to discharge liquid droplets, as shown in FIG. 2.

This ink jet recording head 2 comprises a plurality of electricity-heat converters 20 which are formed as films on a substrate via a semiconductor manufacturing process such as etching, evaporation or sputtering, a plurality of electrodes 22, a plurality of nozzle walls 23 and a ceiling plate 24.

The recording ink is supplied from an ink tank, not shown, through a supply tube 25 and a supply tube connector 26 into a common liquid chamber 2B provided behind each nozzle 2A on the substrate 21. The ink supplied within the common liquid chamber 2B is supplied into each nozzle 2A with the capillary phenomenon, and stably held on the discharge port face 2C at a leading end of the nozzle 2A owing to the meniscus formed. At this time, if the electric current is passed to the electricity-head converter 20 through the electrode 22, the ink on the electricity-heat converter is heated, causing a bubbling phenomenon, so that liquid droplets are discharged through discharge ports 2D with the bubbling energy. Here, the nozzles 2A are formed at a high nozzle density such as 400 DPI.

Figure 3:
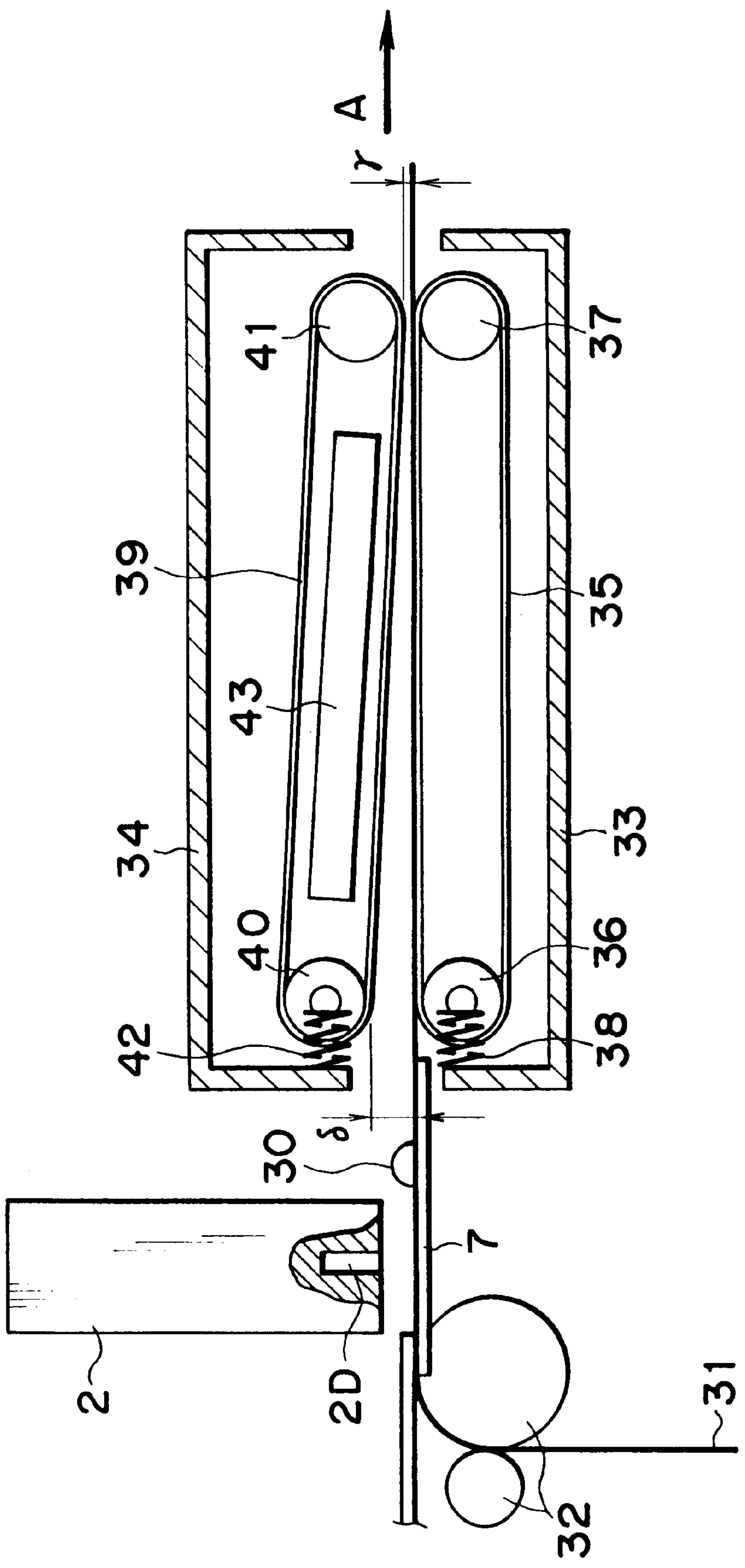
FIG. 3 is a schematic side view showing a first embodiment of an ink drying/fixing unit in the example of the present invention.

Next, the ink drying/fixing unit in this embodiment will be described with reference to FIG. 3. FIG. 3 is a schematic side view showing the ink drying/fixing unit in the first embodiment of the present invention.

A recording member 31 recorded with the discharge of ink droplets 30 through the discharge ports 2D is conveyed on the platen in the A direction as shown by a pair of recording member conveying rollers 32 so as to enter the ink drying/fixing unit surrounded by reflecting plates 33, 34. The reflecting plates 33, 34 are preferably made of a material with high reflectance to the light such as stainless steel or aluminum.

Within the ink drying/fixing unit, a belt which is recording medium conveying means is looped under tension around a belt conveying roller 36 and a belt driving roller 37. Between the belt conveying roller 36 and an inner face of the reflecting plate 33 is extended a spring 38 to exert a tensile force on the belt 35. To the belt driving roller 37 is connected a drive motor, not shown, whereby the belt 35 is moved at the same speed as the recording member 31 in the direction of arrow A as shown, while synchronizing the rotation of the drive motor with the rotation of the recording member conveying roller 32, so that the recording medium 31 is smoothly conveyed within the ink drying/fixing unit.

Also, above the recording member 31, a high temperature belt 39 as a high temperature member is looped under tension around a belt conveying roller 40 and a belt driving roller 41 like the belt 35 as above-mentioned. Between the belt conveying roller 40 and an inner face of the reflecting plate 34 is extended a spring 42 to exert a tensile force on the high temperature belt 39. To the belt driving roller 41 is connected a drive motor, not shown, whereby the high temperature belt 39 is moved opposite to a record face of the recording medium in the direction of arrow A as shown, while synchronizing the rotation of the drive motor with the rotation of the recording member conveying roller 32. Furthermore, a heater 43 is provided in a portion surrounded by the high temperature belt 39, the temperature of which rises with the radiant heat from the heater 43. The material of the high temperature belt 39 is preferably a high heat resistive film which is obtained by drawing in a uniaxial or biaxial orientation a crystalline polymer such as PET (polyester), PES (polyethersulfone), PPA (polyparabanic acid), PI (polyimide), PPS (polyphenylene sulfide), PIA (polyimidoamide), PBT (polybutyleneterephtlalate), PC (polycarbonate), PEI (polyetherimide), or a high heat resistive film of fluororesin such as PFA (perfluoroalkoxide), PTFE (polytetrafluoroethylene). As the crystalline polymer is generally excellent in the creep characteristics at high temperature, the tensile force acting on the high temperature belt 39 can be increased, thus providing for the mechanical stabilization. The high heat resistive film of fluororesin has the advantage that ink droplets 30 are unlikely to stick thereto even if they are placed into contact, or the degree of freedom in designing the ink can be increased because it is not likely to be attacked by chemicals contained in the ink itself. Also, the material of the high temperature belt 39 may be a high heat resistive rubber such as silicone rubber or fluororubber.

On the line vertically lowered from a center of the belt conveying roller 40, a clearance δ of recording medium entry portion formed by a surface of the high temperature belt 39 and a surface of the belt 35 is set to be larger than the maximum thickness of recording member 31 plus the maximum height of ink droplet 30 (an appropriate value of δ will be described later). Here, since it is difficult to actually measure the maximum height of ink droplet 30, presuming that discharged ink droplet 30 impinges onto a record face of recording member 31 in the spherical condition when the surface tension of ink droplet 30 is sufficiently large, and the surface active energy on the record face of recording medium 31 is sufficiently small, and representing the ink discharge volume per discharge to be x[pl], the maximum height H[μm] of ink droplet 30 is calculated as $$H = \sqrt[3]{\frac{6\times 10^3}{\pi}\times x}\ [\mu\text{m}]$$

Actually, owing to the gravitational force acting on the ink droplet 30, and because the contact angle of ink droplet 30 with the recording medium 31 is 120° or less in ordinary materials, the height of ink droplet 30 is by no means expressed as above described, but conversely not exceeding the above-mentioned height. Also, in the color or monocolor recording, the ink droplet 30 may be overwritten plural times in order to give the density gradation for one dot. In this case, supposing that the ink discharge volume per discharge is x[pl] and the number of overwrites is N, the maximum height of ink droplet 30 $H_N$[μm] is calculated as $$H_N = \sqrt[3]{\frac{6\times 10^3}{\pi}\times x\times N}\ [\mu\text{m}]$$

The clearance formed by the surface of the high temperature belt 39 and the surface of the belt 35 is narrowed slopingly in the direction of conveying the recording medium 31, and a clearance γ at the recording medium exit portion lying on the line vertically lowered from a center of the belt driving roller 41, at which the clearance is minimum, is set to be smaller than the maximum thickness of recording medium 31 plus the maximum height of ink droplet 30, and larger than the maximum thickness of recording medium 31 (an appropriate value of γ will be described later).

Here, the clearance δ at the recording medium entry portion is adjusted by the distance between two belt conveying rollers 36, 40, and the clearance at the recording medium exit portion is adjusted by the distance between two belt driving rollers 37, 41.

Next, a process of drying and fixing ink droplets 30 discharged onto the recording medium 31 with the above-mentioned constitution will be described below.

First, ink droplets 30 discharged through the discharge ports 2D of the ink jet recording head 2 impinge onto the recording medium 31, and are conveyed in the direction of arrow A as shown along with the recording medium to reach the recording medium entry portion. Up to this portion, ink droplets 30 are slightly fixed due to the air-drying and the suction into the recording medium 31.

Ink droplets 30 entering the ink drying/fixing unit are dried and fixed with the heat radiation from the high temperature belt 39, the temperature of which has risen with the radiant heat from the heater 34. As the high temperature belt 39 is moving in the direction of arrow A as shown, ink droplets 30 are not rubbed to yield stains, even if the high temperature belt 39 may be brought into contact with ink droplets 30 due to minute wavinesses of the recording medium 31. Accordingly, the high temperature belt 39 can be provided closely to the recording medium 31, so that the drying of ink droplets 30 can be achieved efficiently. And since the temperature of ink droplets 30 may rise with the thermal conduction from the high temperature belt 39 which makes contact with ink droplets 30, the drying will progress more rapidly.

Figure 5A:
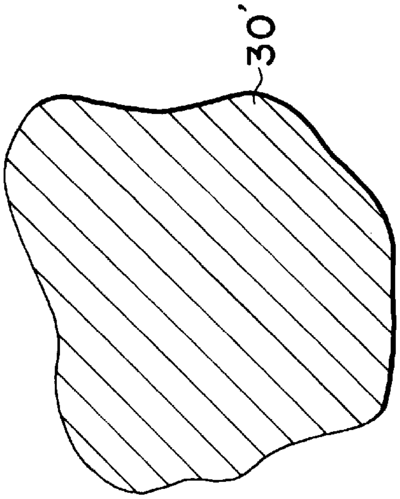
FIG. 5A is a plan view of the ink droplet after the recording medium comes into contact with a high temperature belt in a state of FIG. 4A.
Figure 5B:
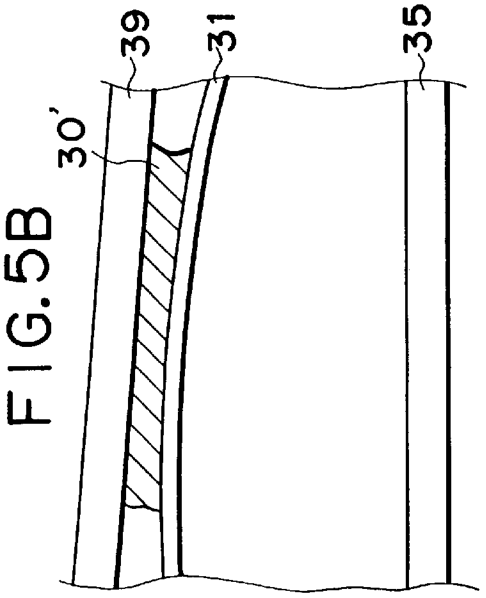
FIG. 5B is a side view of the neighborhood of the ink droplet.
Figure 4A:
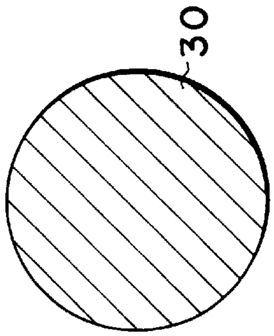
FIG. 4A is a plan view of an ink droplet near an entry portion into the recording medium.
Figure 4B:
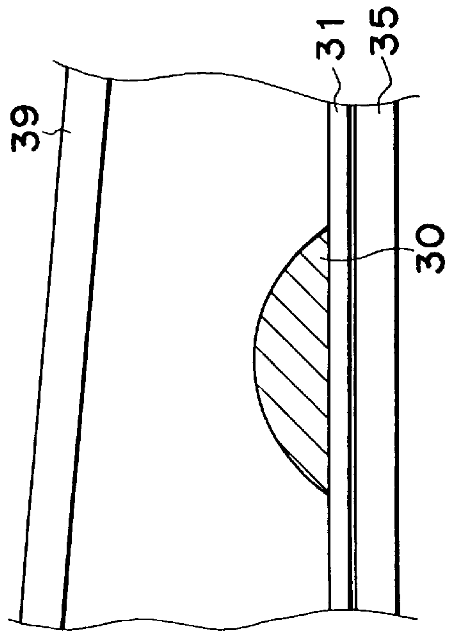
FIG. 4B is a side view of the neighborhood of the ink droplet.

However, if the recording medium 31 is placed in proximity of the high temperature belt 39 near the recording medium entry portion where ink droplets have not been fixed greatly, there is a possibility that pixels may be broken. In the following, the reason for that will be described with reference to FIGS. 4A and 4B, and FIGS. 5A and 5B. FIG. 4A is a plan view of ink droplet in the vicinity of recording medium entry portion, and FIG. 4B is a side view of the neighborhood of the ink droplet. FIG. 5A is a plan view of ink droplet in a state of FIG. 4A after the recording medium has made contact with the high temperature belt, and FIG. 5D is a side view of the neighborhood of its ink droplet. In FIG. 4A, the pixel consisting of ink droplet 30 is of an ideal shape, but as shown in FIG. 5B, unfixed ink droplet 30' may collapse and spread if the recording medium 31 makes contact with the high temperature belt 39, so that the pixel may be broken.

Figure 7A:
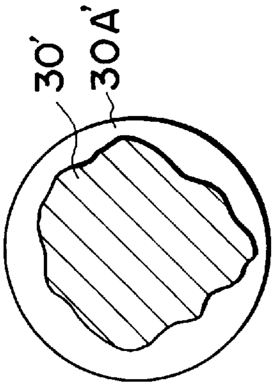
FIG. 7A is a plan view of the ink droplet after the recording medium comes into contact with a high temperature belt in a state of FIG. 6A.
Figure 7B:
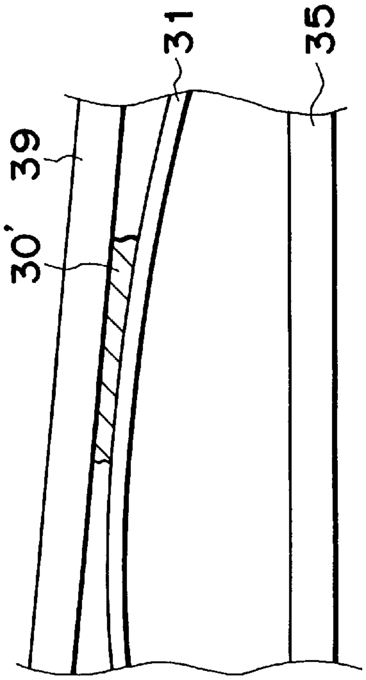
FIG. 7B is a side view of the neighborhood of the ink droplet.
Figure 6A:
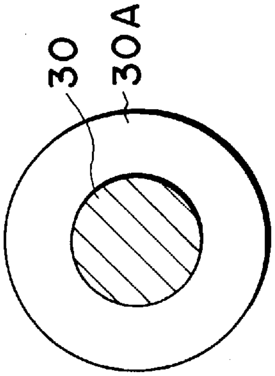
FIG. 6A is a plan view of an ink droplet which is being fixed.
Figure 6B:
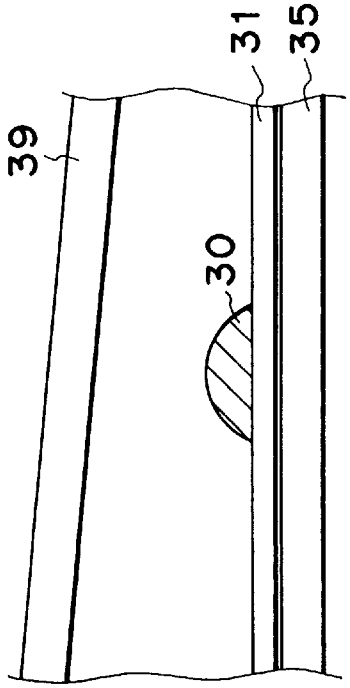
FIG. 6B is a side view of the neighborhood of the ink droplet.

On the contrary, in the vicinity of recording medium exit portion where the ink droplet 30 is fixed, the pixel will not be broken even if the recording medium 31 is placed into contact with the high temperature belt 39. In the following, reference will be made to FIGS. 6A and 6B, and FIGS. 7A and 7B. FIG. 6A is a plan view of an ink droplet where the fixing progresses, and FIG. 6B is a side view of the neighborhood of its ink droplet. FIG. 7A is a plan view of an ink droplet in a state of FIG. 6A after the recording medium has made contact with the high temperature belt, and FIG. 7B is a side view of the neighborhood of its ink droplet. In FIG. 6A, unfixed ink droplet 30 only remains in a central portion of ink droplet 30A which has already been fixed. In this state, unfixed ink droplet 30' may collapse and spread as shown in FIG. 7A if the recording medium 31 is placed into contact with the high temperature belt 39, as shown in FIG. 7B, but the pixel may not be broken because unfixed ink droplet 30' will spread within a range of already fixed ink droplet 30A'.

Accordingly, if the clearance δ at the recording medium entry portion is set to be larger than the maximum thickness of recording member 31 plus the maximum height of ink droplet 30 on the recording medium 31, and the clearance γ at the recording medium exit portion is set to be smaller than the above-mentioned height, and larger than the maximum thickness of recording medium 31, the ink droplet 30 does not make contact with the high temperature belt 39 in the vicinity of recording medium entry portion where there are many unfixed ink droplets, while the ink droplet 30 makes contact with the high temperature belt 39 in the vicinity of recording medium exit portion, so that there is provided an ink drying/fixing unit better in heat efficiency and with less degradation of image.

Second Embodiment

Figure 8:
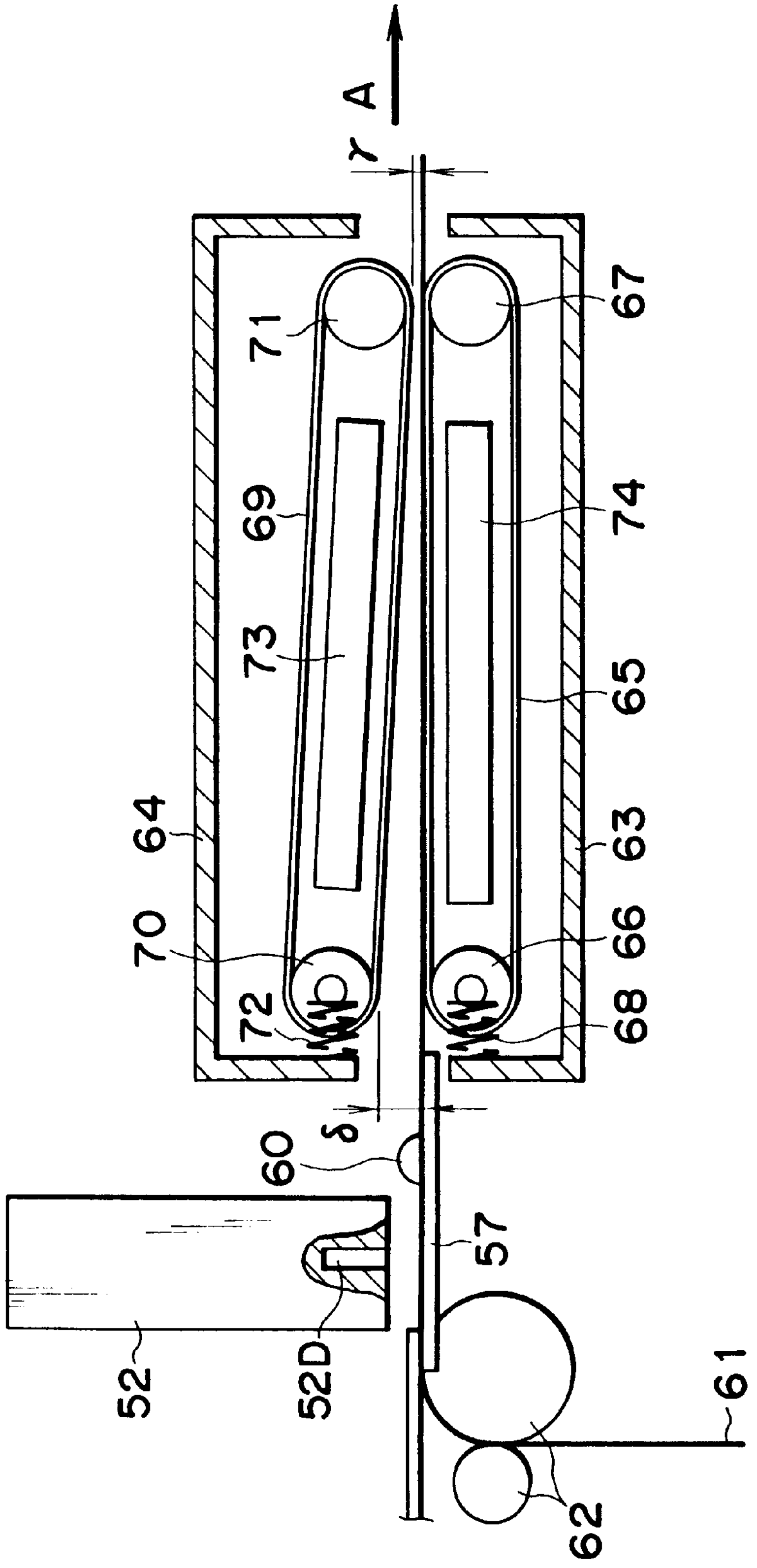
FIG. 8 is a schematic side view showing a second embodiment of the fixing unit in the example of the present invention.

A second embodiment of the present invention will be described with reference to FIG. 8. FIG. 8 is a schematic side view showing a second example of the present invention. An ink jet recording head 52, discharge ports 52D, a platen 57, recording member conveying rollers 62, reflecting plates 63, 64, a belt 65, belt conveying rollers 66, 70, belt driving rollers 67, 71, springs 68, 72 and a heater 73 may be the same as in the first embodiment, but a heater 74 is one of having only a heating value not enough to fix the ink.

The second embodiment is different from the first embodiment in that the heater 74 which is means for heating the belt 65 is provided on a portion encircled by the belt 65. In this case, the material of the belt 65 is preferably one of transmitting the energy radiated by the heater 74 the wavelength of which is easily absorbed by the recording medium 61.

With the above constitution, the temperature of the belt 65 will rise with the radiant heat of the heater 74. However, the heat radiation of the heater 74 must not dry up the ink abruptly at the entry of fixing area. Accordingly, ink droplets 60 on the recording member 61 can be dried up rapidly, in addition to the heat radiation from the high temperature belt 69, owing to the heat conduction from the belt 65 and the heat radiation from the heater 74, which will act from a back side of the recording medium 61.

Third Embodiment

Figure 9:
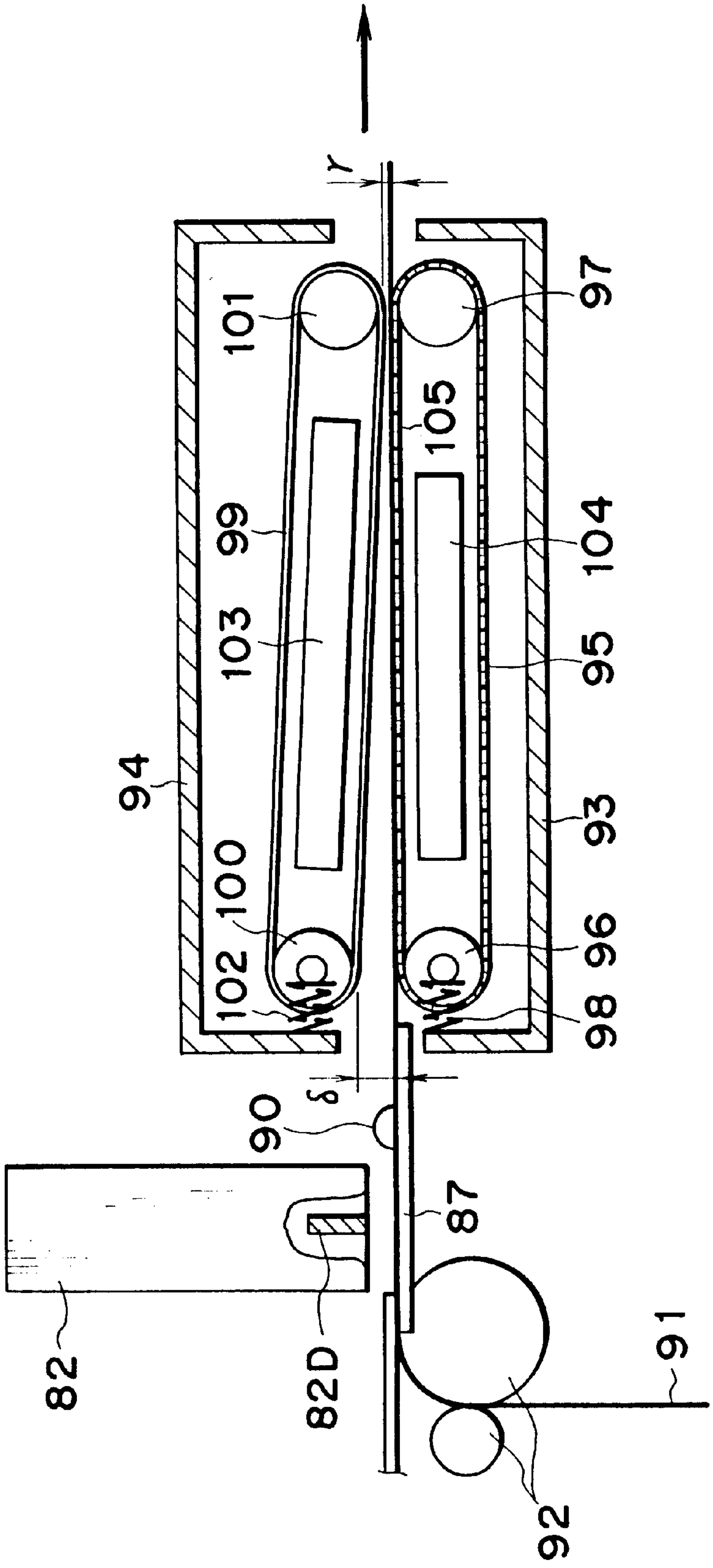
FIG. 9 is a schematic side view showing a third embodiment of the fixing unit in the example of the present invention.

A third example of the present invention will be described with reference to FIG. 9. FIG. 9 is a schematic side view showing a third embodiment of the present invention. An ink jet recording head 82, discharge ports 82D, a platen 87, recording member conveying rollers 92, reflecting plates 93, 94, belt conveying rollers 96, 100, belt driving rollers 97, 101, springs 98, 102 and a heater 103 may be the same as in the first embodiment, and will not be further described. In this following, the features of this embodiment will be described.

The third embodiment is different from the first embodiment in that a number of communicating holes 105 are formed on the belt 95, and a suction fan 104 sucking the recording member is mounted on a portion encircled by the belt 95.

With the above constitution, the recording medium 91 is prevented from floating up, because the recording medium 91 on the belt 95 is sucked onto the belt 95 by the suction fan 104, so that the contact between the recording medium 91 and the high temperature belt 99 becomes stabler on the downstream side in the direction of conveying the recording medium 91 in which ink droplets 90 are more fixed. Accordingly, the degradation of image due to the contact between the recording medium 91 and the high temperature belt 90 is less likely to occur.

The far infrared radiation can be effectively utilized to dry the ink if the heater in the first to third embodiments as above-described is made of a material omitting the far infrared radiation, and the high temperature belt is constructed with a far infrared radiation transmitting belt.

The heater may be one of having many wavelength components in an infrared area, such as a far infrared radiation ceramic heater, tungsten halogen lamp or nichrome wire heater, or may be a heater such as a POSISTOR (registered trademark of Murata Manufacturing Co., Ltd.).

As the material for the high temperature belt, materials as shown in the previously described embodiment can be appropriately used.

Also, the far infrared radiation heater and the far infrared radiation transmitting belt can be appropriately used in the fourth embodiment as will be described in the following.

Fourth Embodiment

Figure 10:
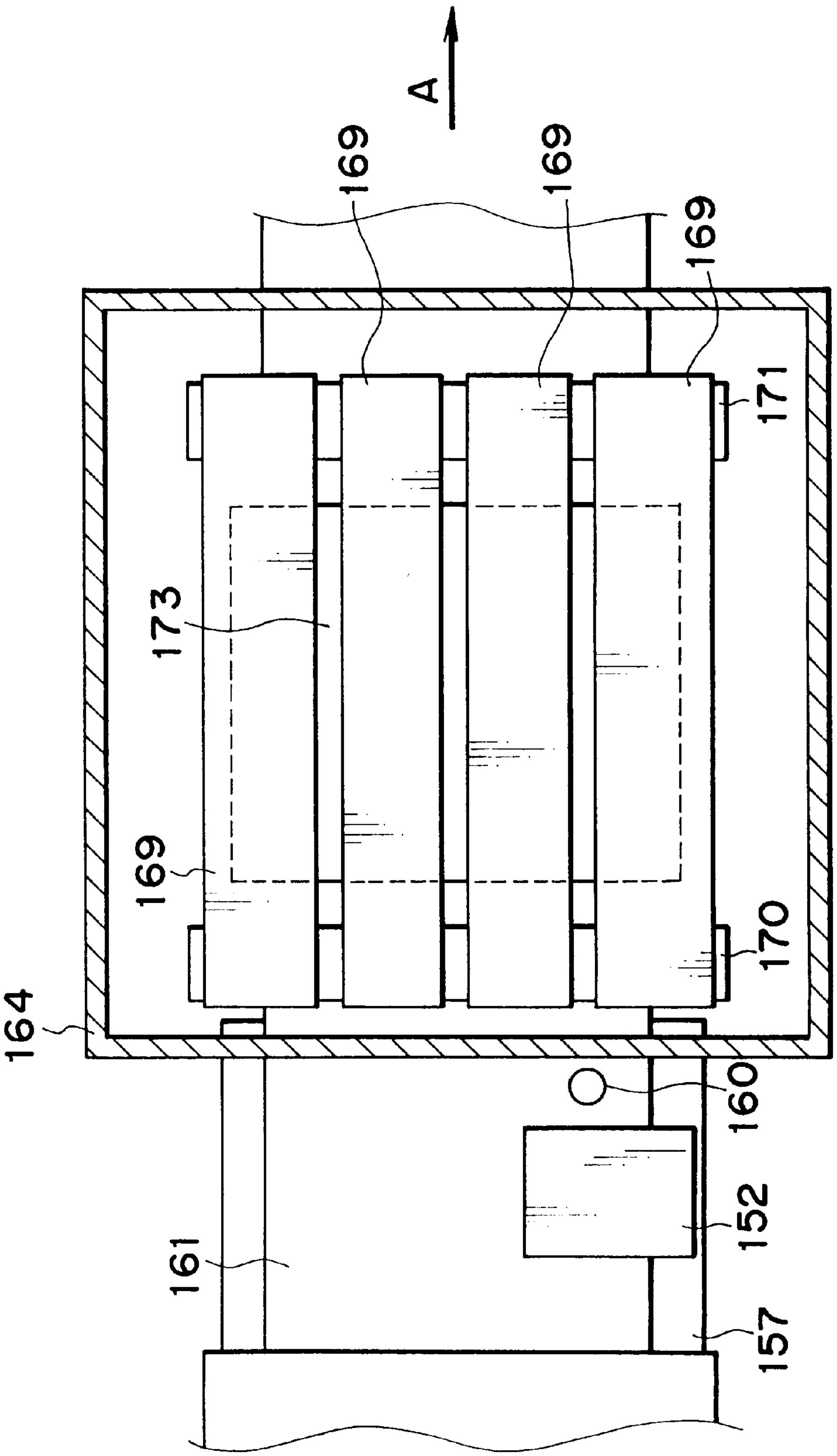
FIG. 10 is a schematic side view showing a fourth embodiment of the fixing unit in the example of the present invention.

A fourth embodiment of the present invention will be described with reference to FIG. 10. FIG. 10 is a schematic plan view showing the fourth embodiment in the example of the present invention.

The fourth embodiment is different from the first embodiment in that a plurality of far infrared radiation transmitting belts 169 are spaced from each other and looped under tension around the belt conveying rollers 170 and the belt driving rollers 171, respectively.

If ink droplets 160 are dried and fixed with the heat radiation of the heater 173, the water vapor produced with the drying of ink droplets 160 may saturate within the space formed by the recording member 161 and the far infrared radiation transmitting belts 169, thereby decreasing the ability of drying the ink. With the above constitution, the water vapor can be let off upward through the clearance between adjacent two far infrared radiation transmitting belts 169 so as to have as little water vapor remaining between the recording medium 161 and the far infrared radiation transmitting belts 169 as possible, so that the ability of drying ink droplets can be prevented from decreasing.

Means for letting off the water vapor produced with the drying of ink droplets is not limited to the above constitution, but the far infrared radiation transmitting belts 169 may be provided with a number of communicating holes. The ink jet recording head 152, the platen 157, and the reflecting plate 164 may be the same as in the first embodiment, and thus are not described any more.

In the first to fourth embodiments as above detailed, a preferred range of δ is from 2 mm to 15 mm, in which range the fixing mechanism and ink droplets on the recording member are not contact, and more preferably from 5 mm to 10 mm. Also, a preferred range of γ is from 0 mm to 0.2 mm, which is suitable for conveying the recording medium substantially fixed, and more preferably from 0 mm to 0.1 mm. Note that the thickness of a recording sheet used in the previous embodiment is 0.1 mm. It is preferable to set appropriate values of δ and γ depending on the thickness of the recording sheet to be used.

Also, it is preferable to provide a temperature gradient within the fixing unit so that the temperature of the recording sheet on the record face side at the fixing unit entry portion may be from 50° C. to 70° C., and the temperature of recording sheet on the record face side at the fixing unit exit portion may be from 160° C. to 200° C.

Furthermore, the facsimile apparatus, to which the present invention can be appropriately applied, has a fixing speed such as one A4-sized recording sheet per minute for the serial-type recording head (with a conveying speed of 5 mm/sec to 10 mm/sec), or eight A4-sized recording sheets per minute for the full-line type recording head (with a conveying speed of 25 mm/sec to 50 mm/sec). At this time, the length of the fixing area is from 30 mm to 250 mm, and more preferably from 100 mm to 150 mm.

As above described, in the first to fourth embodiments, the recording medium and the high temperature belt move in the same direction, but more preferably, their speeds are also made equal, because the recording sheet is less likely to be stained even if the high temperature belt is placed in contact with ink droplets. The serial-type ink jet recording apparatus was described, but the present invention is the most effective for the full-line type ink jet recording apparatus which performs the high speed recording.

Moreover, the following effects can be exhibited.

If the high temperature member is provided opposed to the record face of a recording medium being conveyed with the record face directing upward, and moved in the same direction as the recording medium, the stable conveyance of the recording medium can be performed, whereby the heat can be utilized more effectively, and ink droplets can be fixed at high speed.

If the clearance formed by the surface of the high temperature member and the surface of the recording medium conveying means is set to be greater than the maximum thickness of thee recording medium plus the maximum height of an ink droplet on the recording member at the recording member entry portion, and smaller than the abovementioned height at the recording member exit portion so as to place the recording member in contact with the high temperature member in the vicinity of the recording medium exit portion, it is possible to fix ink droplets more efficiently, without destroying the pixels.

Furthermore, by providing heating means for heating the recording medium conveying means to a temperature exceeding that of the recording medium, it is possible to fix ink droplets more rapidly with the heat conduction through the recording medium.

In addition, if the recording member conveying means is formed with a number of communicating holes, and a suction fan for sucking the recording medium is disposed on a back side of the recording medium conveying means, the recording medium and the high temperature member are brought into contact more stably in the vicinity of the recording medium exit portion, so that a stabler recording can be accomplished without degradation of the image.

As the recording sheet just recorded can be gradually dried, rather than abruptly, it is possible to prevent wrinkles of recording sheet or non-uniform densities from occurring.

Furthermore, in the first to fourth embodiments as previously described, the following effects can he exhibited by using the far infrared radiation heater and the far infrared radiation transmitting high temperature belt.

By interposing a member of transmitting the far infrared radiation between the heater and the recording member, the heater can be provided in proximity of the recording medium, so that drying/fixing of the ink can be performed more safely, without occurrence of a fire due to jamming of recording member, while effectively utilizing the energy of the wavelength having far infrared radiation components radiated from the heater.

By moving the member of transmitting the far infrared radiation in the same direction as the recording member, the image is by no means degraded even if ink droplets on the recording medium may make contact with the member of transmitting the far infrared radiation.

Further, if the far infrared radiation transmitting member is provided with means for letting off the water vapor on the recording medium, it is possible to suppress the saturation of the water vapor accumulating between the recording member and the far infrared radiation transmitting member, and prevent the ability of drying ink droplets from decreasing.

In addition, if the recording member conveying means is formed with a number of communicating holes, and a suction fan for sucking the recording member is disposed on a back side of the recording member conveying means, it is possible to convey the recording member more stably.

Fifth Embodiment

Figure 11:
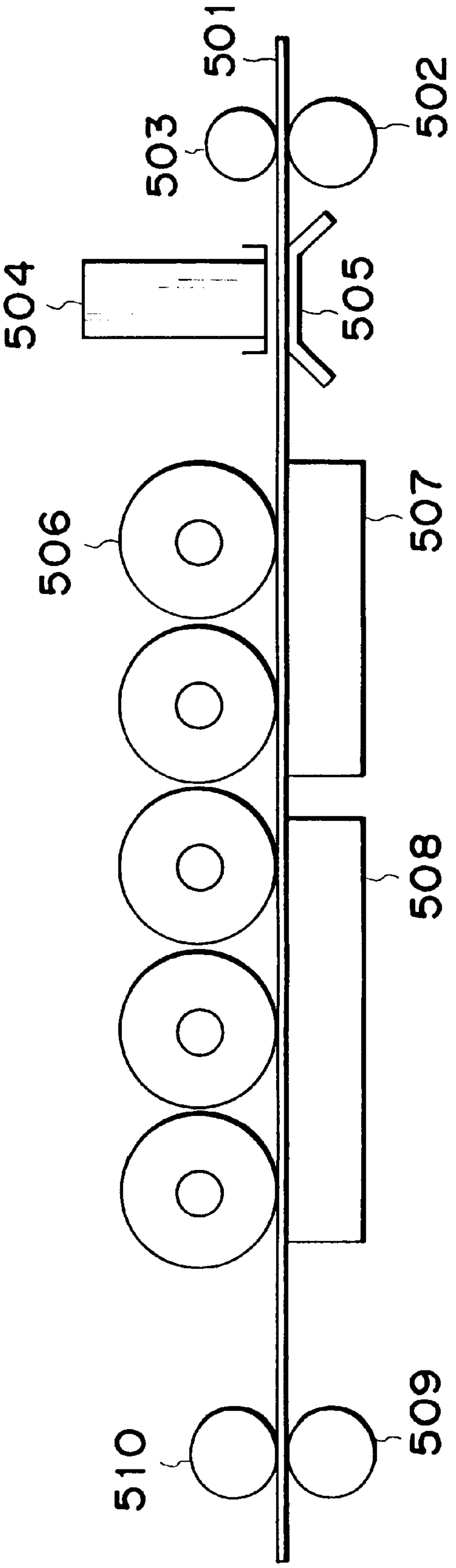
FIG. 11 is a view showing a constitution of a fifth embodiment in the example of the present invention.

FIG. 11 is a view showing the constitution of a fifth embodiment according to the present invention, that is, a cross-sectional view showing the constitution of a recording unit and a fixing unit in an ink jet recording apparatus.

This embodiment is one of making the recording and fixing on a recording sheet 501, which is an unrecorded member.

The recording unit consists of a paper feed roller 502 for driving the feeding of recording sheet 501, a paper feed presser roller 503 for supplying a conveying force to the paper feed roller 502, a recording head 504 for recording onto the recording sheet 501 by the discharge of ink to form an image, and a platen 505.

The fixing unit consists of a plurality of fixing conveying rollers 506 for conveying the recording sheet 501 just recorded by making contact with a record face of the recording sheet 501 at points or lines so as not to destroy the image, a low temperature heater 507 for providing a preheating area where the recording sheet 501 just recorded is preheated, and a high temperature heater 508 for providing a fixing area where the ink is dried and fixed. The fixing conveying rollers 506 are provided to press on a record face side of the recording sheet 501. The low temperature heater 507 and the high temperature heater 508 have heating portions extending over an entire recording width of the recording sheet 501, respectively, and are provided opposed to the fixing conveying rollers 506, with the recording sheet 501 carried therebetween. The low temperature heater 507 is provided closer to the recording head 504 in order to heat the recording sheet 501 just recorded beforehand. Thereby, the former half portion on the side of the recording head 504 serves as a preheating area, and the latter half portion serves as a fixing area.

The recording sheet 501 which has been recorded and fixed in the recording and fixing units as above described is exhausted out of the apparatus by being carried between a paper exhaust roller 509 and a paper exhaust presser roller 510 for giving a conveying force to the paper exhaust roller 509.

Next, the operation of this embodiment will be described.

First, the recording sheet 501 is conveyed into the recording unit with the driving of the paper exhaust roller 502. And if the recording sheet 501 is conveyed up to a recording position on the platen 501, the recording is performed by the recording head 504. The ink just deposited onto the recording sheet 501 is in a state of swelling hemispherically with the surface tension, without permeating into the recording sheet 501. The recording sheet 501 after recording is conveyed into the fixing unit.

The recording sheet 501 is first heated by the low temperature heater 507. The temperature of the low temperature heater 507 is set to be lower than that of the ink deposited on the recording sheet 501 which can be completely dried and fixed, and the recording sheet 501 is in a state where ink droplets are sufficiently spread and permeated, as well as being warmed uniformly.

Next, the preheated recording sheet 501 is conveyed to the area of the high temperature heater 508, the temperature of which has been set above a temperature of fixing the ink, whereby the ink deposited on the recording sheet 501 is heated to a temperature at which the ink is dried and fixed.

Here, means for pressing the recording sheet 501 against the above-mentioned two heaters is requisite, but in this embodiment, the fixing conveying rollers 506 are also used for that means. As this fixing conveying rollers 506 will be placed into direct contact with the record face before fixing the ink, it is apprehended that the image may be affected. Therefore, the fixing conveying roller 506 is made of a material with high rigidity and placed in contact at a point or line contact so as to make the contact area with the record face as least as possible.

In this embodiment, the recording sheet 501 just recorded is placed in a preheating state where ink droplets are sufficiently spread and permeated by the low temperature heater 507, rather than being abruptly heated, and then heated by the high temperature heater 508 to a temperature at which the ink can be dried up, so that the fixing unit which does not affect the image can be easily fulfilled, without changing the fixing speed greatly. As the low temperature heater 507 is provided in the preheating area, and the high temperature heater 508 is provided in the fixing area, the temperature control of each area can be performed accurately to obtain an excellent record image. Further, changed portions are small, so that a great increase of the cost or a larger apparatus may not be required.

Note that the surface temperature of the low temperature heater 507 for use with this embodiment is 85° C., the surface temperature of the high temperature heater 508 is 160° C., the temperature of a record face of the recording sheet 501 on the low temperature heater 507 is 70° C., the temperature of a record face of the recording sheet 501 on the high temperature heater 508 is 120° C., and the ion implantation amount is 27 nl/mm$^2$.

Sixth Embodiment

Figure 12:
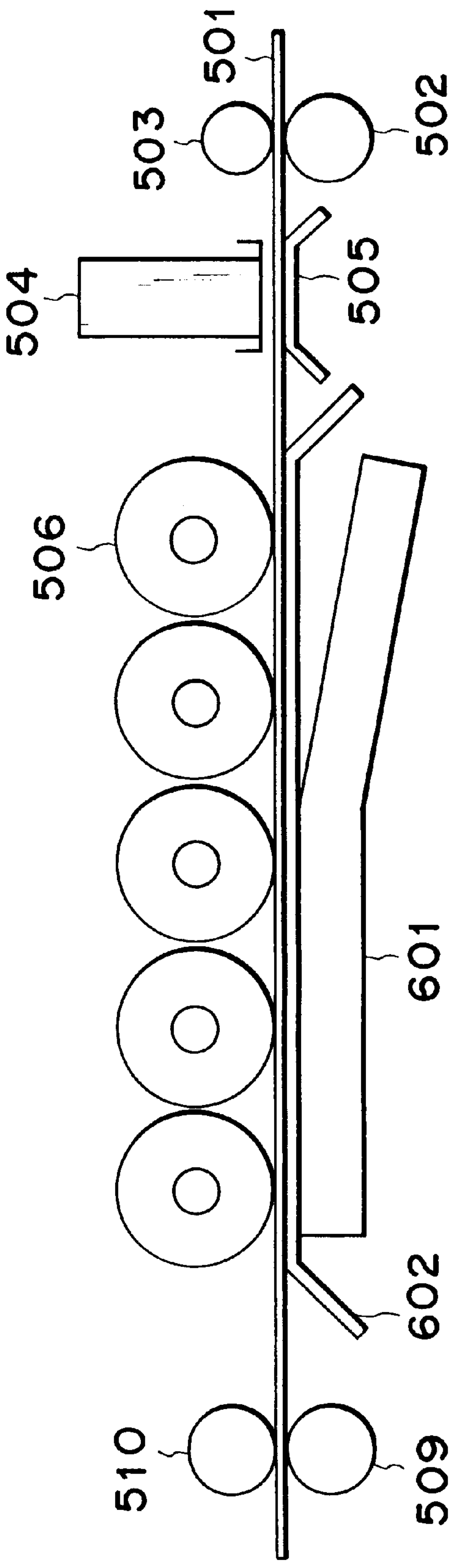
FIG. 12 is a view showing a constitution of a sixth embodiment in the example of the present invention.

FIG. 12 is a view showing the constitution of a sixth embodiment in the example of the present invention.

This embodiment further comprises a slanted heater 601, which is sloped so as to be spaced away from the recording sheet 501 immediately after recording, and to approach closer to the recording sheet 501 in conveying the recording sheet 501, on a former half portion of the recording head 504 side, instead of the low temperature heater 507 and the high temperature heater 508 in the fifth embodiment as shown in FIG. 11, and a fixing guide 602 made of a material having high thermal conductivity which is provided between the recording sheet 501 and the slanted heater 601 in order to guide a back side of the record face of the recording sheet 501 within the fixing unit, as well as transmitting the heat radiated from the slanted heater 601 to the recording sheet 501. As other constitutions are the same as in the fifth embodiment as shown in FIG. 11, like numerals are attached as in FIG. 11, and the explanation will be omitted.

The slanted heater 601 in the embodiment can produce sufficient heat to dry and fix ink droplets discharged onto the recording sheet 501, but it is located away from the recording sheet 501 in the former half portion which is slanted, so that the recording sheet is placed in the preheated state where ink droplets are sufficiently spread and permeated, as well as being uniformly heated.

As described, in this embodiment, the slanted former half portion of the slanted heater 601 is a preheating area, and the area of the slanted heater 601 to which the recording sheet 501 approaches is a fixing area. Thereby, the same effects as in the fifth embodiment as shown in FIG. 11 can be obtained.

Seventh and Eighth Embodiments

Figure 13:
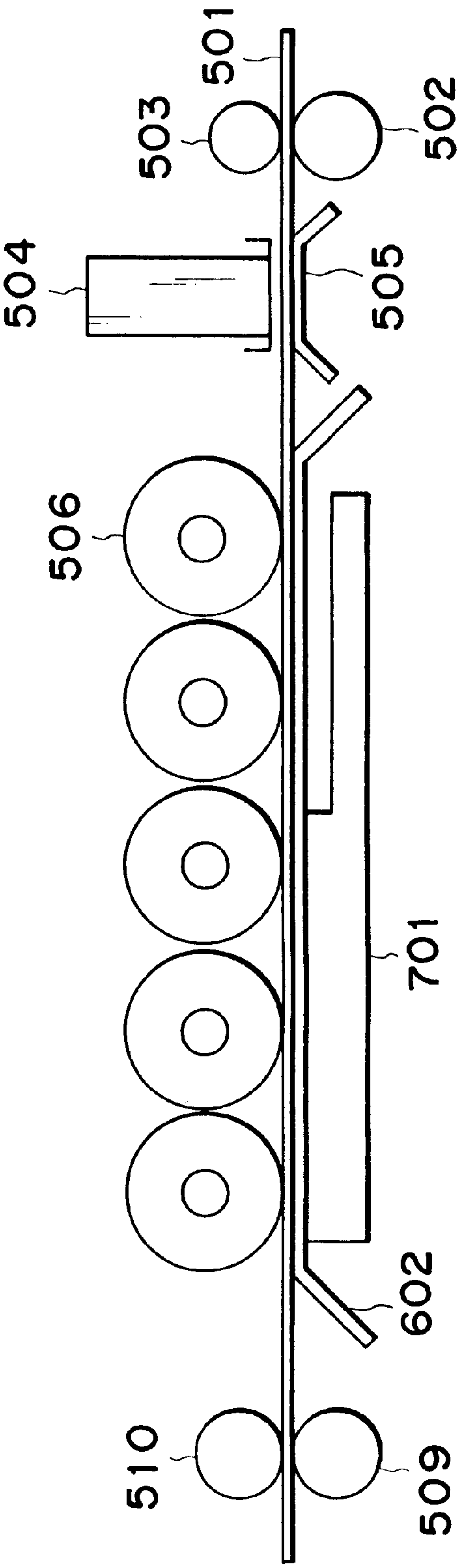
FIG. 13 is a view showing a constitution of a seventh embodiment in the example of the present invention.
Figure 14:
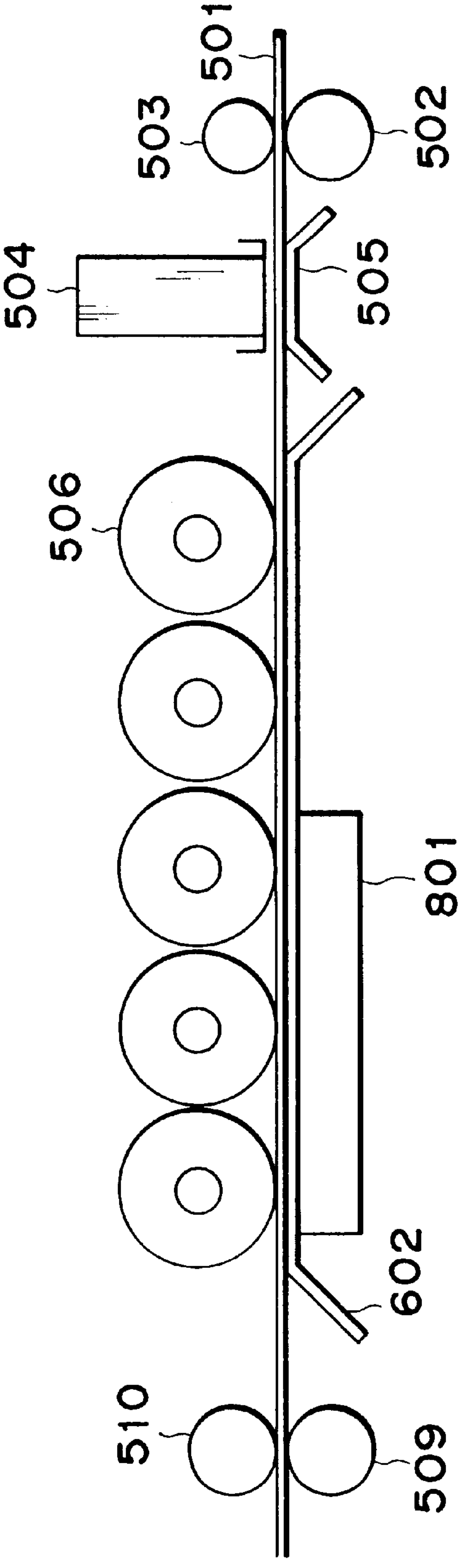
FIG. 14 is a view showing a constitution of an eighth embodiment in the example of the present invention.

FIGS. 13 and 14 are views showing the seventh and eighth embodiments in the example of the present invention, respectively.

The seventh embodiment as shown in FIG. 13 has a stepped heater 701 formed with a cut-out on the former half portion, instead of the slanted heater 601 as shown in FIG. 12, while the eighth embodiment as shown in FIG. 14 has a heater of the shape in which the former half portion is removed, rather than being slanted as shown in FIG. 12. As other constitutions are the same as in the sixth embodiment as shown in FIG. 12, like numerals are attached as in FIG. 12 and the explanation will be omitted.

Even if the sloping such as the slanted heater 601 in the sixth embodiment as shown in FIG. 12 is not provided, the heat distribution of the fixing guide 602 can be made closer to the state as shown in FIG. 12, by providing a step with the cut-out such as the stepped heater 701 in the seventh embodiment as shown in FIG. 13, or disposing only the latter half portion of the fixing unit such as the heater 801 in the eighth embodiment as shown in FIG. 14, whereby excellent fixing of ink is achieved.

Ninth Embodiment

Figure 15:
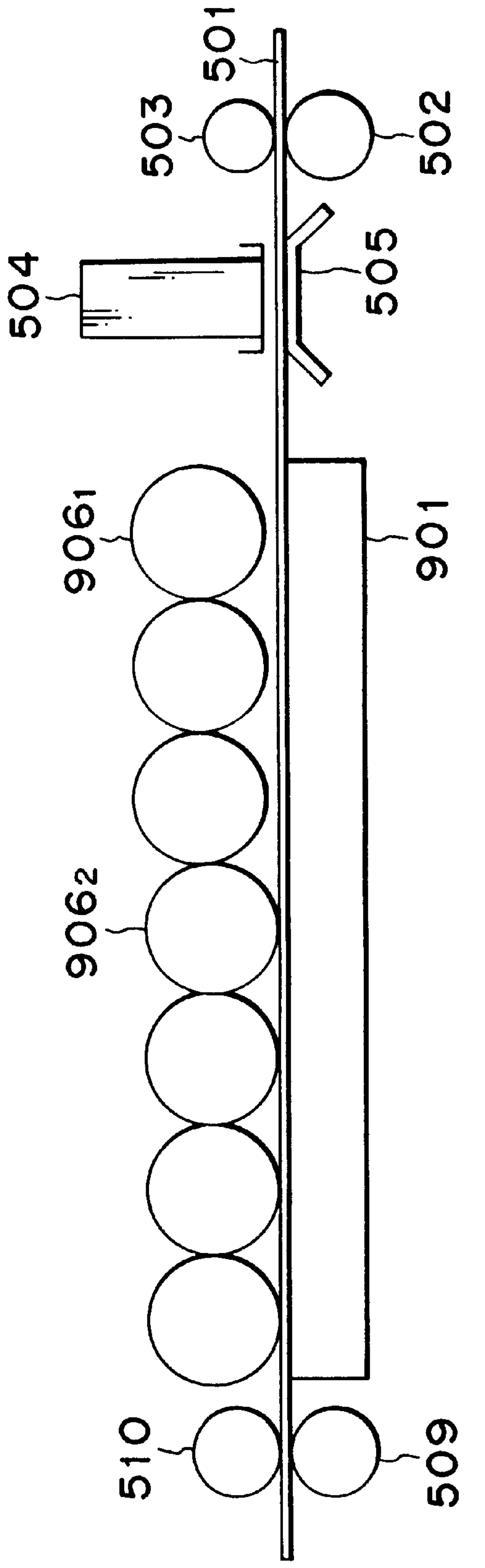
FIG. 15 is a view showing a constitution of a ninth embodiment in the example of the present invention.

FIG. 15 is a view showing the constitution of a ninth embodiment in the example of the present invention.

This embodiment replaces the fixing conveying rollers 506 in the fifth embodiment as shown in FIG. 11 with a plurality of fixing conveying rollers 906$_1$ and a plurality of fixing conveying rollers 906$_2$, of which constitute position adjusting means, and comprises a heater 901, instead of the low temperature heater 507 and tho high temperature heater 508. The fixing conveying rollers 906$_1$ are provided in the preheating area which is on the former half portion near the recording head 504, while the fixing conveying rollers 906$_2$ are provided in the fixing area on the latter half portion. The heater 901 is provided opposite to each fixing conveying roller 906$_1$, 906$_2$, with the recording sheet carried therebetween. The fixing conveying rollers 906$_2$ convey the recording sheet 501 while pressing it against the heater 901, while the fixing conveying rollers 906$_1$ are spaced from the heater.

As other constitutions are the same as in the fifth embodiment as shown in FIG. 11, like numerals are attached as in FIG. 11 and the explanation will be omitted.

The drying and fixing operation of the ink in this embodiment will be described below. In the preheating area on the former half portion, the fixing conveying rollers 906$_1$ are spaced from the heater 901 so as not to place the recording sheet 501 in close contact with the heater 901, so that the recording sheet 501 is in the preheating state where ink droplets are sufficiently spread and permeated, as well as being uniformly heated. In the fixing area on the latter half portion, the heat of the heater 901 can be sufficiently passed to the recording sheet 501 which is then heated, as the recording sheet 501 is pressed against the fixing conveying rollers $\mathbf{906}_2$ so as to be placed into close contact with the heater 901. As the recording sheet 501 has been preheated in the preheating area on the former half portion, the ink is immediately dried upon the recording sheet 501 entering the fixing area and fixed thereto.

As described, in this embodiment, by providing different distances from the heater 901 on the former half and latter half portions, it is possible to make the condition of the heat passed to the recording sheet 501 in the fixing area the same as in each embodiment shown in FIGS. 11 to 14, so that the same effects can be obtained.

Since a single surface heater is only needed, the constitution of the apparatus can be made the same as the conventional one, so that the manufacturing cost will not increase.

Tenth Embodiment

Figure 16:
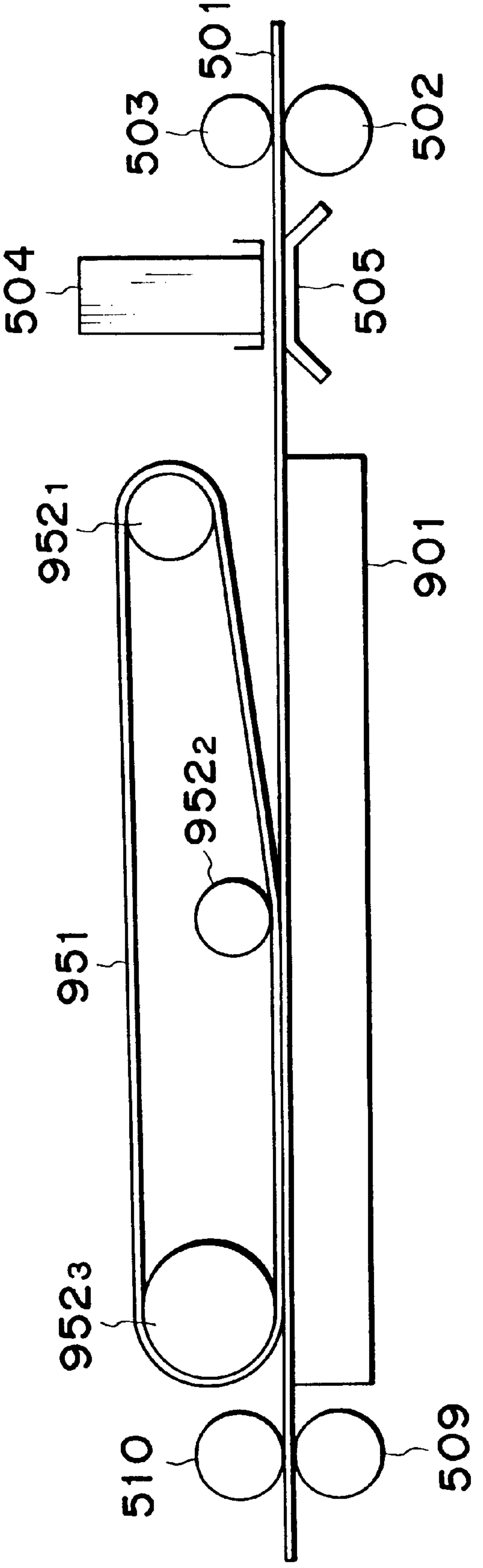
FIG. 16 is a view showing a constitution of a tenth embodiment in the example of the present invention.

FIG. 16 is a view showing the constitution of a tenth embodiment in the example of the present invention.

This embodiment is provided with three belt conveying rollers $\mathbf{952}_1$ to $\mathbf{952}_3$, and a fixing conveying belt 951 which is looped around them, instead of the fixing conveying rollers $\mathbf{906}_1$, $\mathbf{906}_2$ as shown in FIG. 15, as the conveying mechanism for the recording sheet 501.

The fixing conveying belt 951 is spaced from the recording sheet 501 due to the disposition of each of the belt conveying rollers $\mathbf{952}_1$ to $\mathbf{952}_3$ so as not to press the recording sheet 501 against the heater 901 in the preheating area on the former half portion, as in the ninth embodiment shown in FIG. 15, and approaches the recording sheet 501 when coming closer to the fixing area on the latter half portion where the recording sheet 501 is pressed against the heater 901.

As other constitutions are the same as in the tenth embodiment as shown in FIG. 15, like numerals are attached as in FIG. 15 and the explanation will be omitted.

Also in this embodiment as thus constituted, by providing different distances from the heater 901 on the former half and latter half portions, as in the ninth embodiment shown in FIG. 15, it is possible to make the condition of the heat passed to the recording sheet 501 in the fixing area the same as in each embodiment shown in FIGS. 11 to 15, so that the same effect can be obtained.

Eleventh Embodiment

Figure 17:
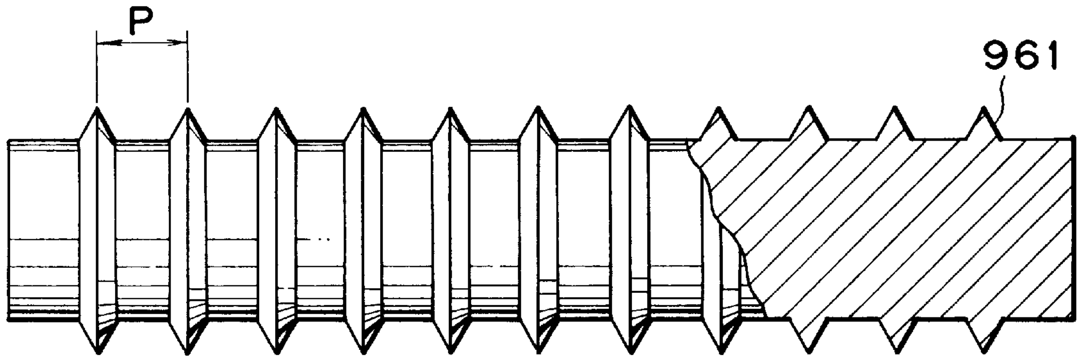
FIG. 17 is a view showing a constitution of an eleventh embodiment in the example of the present invention.

FIG. 17 is a view for explaining an eleventh example of the present invention.

This embodiment is one in which the low temperature heater 507 and the high temperature heater 508 in the fifth embodiment shown in FIG. 11 are constructed as a single heater, and different quantities of heat are passed to the recording sheet on the former half and latter half portions of the fixing unit by providing the fixing conveying rollers of different shapes.

The fixing conveying roller is provided with a plurality of projections 961 as shown in FIG. 17, the pitch P of this projection being larger on the fixing conveying rollers provided in the preheating area on the former half portion, and smaller on the fixing conveying rollers provided in the fixing area on the latter half portion. Thereby, the state of the recording sheet pressed against the heater is made different depending on whether it is in the preheating area on the former half portion or in the fixing area on the latter half portion, and it is possible to make the condition of the heat passed to the recording sheet 501 in the fixing area the same as in each embodiment shown in each of FIGS. 11 to 16, so that the same effects can be obtained.

As to the representative constitution and principle for a recording head or recording apparatus in the ink jet method in the example of the present invention, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) though an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. Nos. 4,558,333, or 4,459,600 disclosing the constitution having the heat acting portion arranged in the flexed region is also included in the present invention. In addition, the present invention can be also effectively made the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion.

Further, as the recording head of the full line type having a length corresponding to the maximum width of a recording medium which can be recorded by the recording device, either the constitution which satisfies its length by a combination of a plurality of recording heads as disclosed in the above-mentioned specifications or the constitution as one recording head integrally formed may be used, and the present invention can exhibit the effects as described above further effectively. In addition, the present invention is effective for a recording head of the freely exchangeable chip type which enables electrical connection to the main device or supply of ink from the main device by being mounted on the main device, or a recording head of the cartridge type integrally provided on the recording head itself.

Also, addition of a restoration means for the recording head, a preliminary auxiliary means, etc. provided as the constitution of the recording device in the example of the present invention is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform a preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

In the fifth to eleventh embodiments as above-described, by setting the temperature transferred to the recording sheet to be lower in the preheating area than in the fixing area, ink droplets are permeated into the recording sheet while being heated gradually in the preheating area, and subsequently, the ink is dried up in the fixing area. Thereby, there is the effect that non-uniformity of fixing density or wavinesses (vertical wrinkles) produced in the abrupt heating immediately after recording can be prevented from occurring without requiring any great increase in the cost or a larger apparatus.

Further, the temperature control in each area can be accomplished accurately, there is the effect that an excellent image can be formed in addition to the above-mentioned effect.

Further, as the constitution of the heater is simple, there is the effect that the above-mentioned effects are provided without increasing any manufacturing cost.

As above detailed, in the first to eleventh embodiments, as the recording sheet after recording can be gradually dried, but not abruptly, the occurrence of wrinkles on the recording sheet or the non-uniformity of density can be prevented.

What is claimed is:

1. A fixing device for an ink jet recording apparatus, for heating a recording medium deposited with an ink droplet discharged through an ink jet recording head and fixing the ink droplet, said device comprising:

a heater member, said heater member including a first heating section for heating the recording medium to a temperature which is not sufficient to completely fix the ink droplet on the recording medium but promotes fixation of the ink droplet, and a second heating section for heating the recording medium heated at said first heating section to a temperature which is sufficient to completely dry the ink droplet deposited on the recording medium, the temperature at said second heating section being higher than the temperature at said first heating section; and a conveying mechanism, said conveying mechanism arranged to move the recording medium from an area where the ink jet recording head is disposed, through said first heating section and said second heating section, wherein said heater member is arranged to face a surface of the recording medium on which ink is deposited so that a distance between said conveying mechanism and said heater member at an inlet side of said first heating section is such that said heater member does not contact the ink droplet deposited on the recording medium, and said heater member being arranged so that the distance between said heater member and said conveying mechanism decreases from said first heating section to said second heating section, wherein the temperature at said first heating section is within a range of 50° C.–70° C. and the temperature at said second heating section is within a range of 160° C.–200° C.

2. A device according to claim 1, wherein said first heating section comprises at least an insertion port through which the recording medium is inserted and said second heating section comprises at least an exhausting port through which the recording medium is exhausted, and wherein a height of said insertion port is greater than a height of the ink droplet on the recording medium and a height of said exhausting port is smaller than the height of said insertion port and greater than the height of the ink droplet on the recording medium.

3. A device according to claim 1, wherein said ink jet recording head comprises an electrothermal converting element and an ink discharge port through which ink is discharged onto the recording medium by thermal energy generated by said electrothermal converting element.

4. An ink jet recording apparatus having a fixing device for heating a recording medium deposited with an ink droplet and fixing the ink droplet, said apparatus comprising:

an ink jet recording head disposed at a recording area for recording an image on the recording medium at the recording area by discharging ink on the recording medium;

a heater member including a first heating section for heating the recording medium to a temperature which is not sufficient to completely fix the ink droplet on the recording medium but promotes fixation of the ink droplet, and a second heating section for heating the recording medium heated at said first heating section to a temperature which is sufficient to completely dry the ink droplet deposited on the recording medium, the temperature of said second heating section being higher than the temperature at said first heating section; and a conveying mechanism, said conveying mechanism arranged to move the recording medium from the recording area, through said first heating section and said second heating section, wherein said heater member is arranged to face a surface of the recording medium on which ink is deposited so that a distance between said conveying mechanism and said heater member at an inlet side of said first heating section is such that said heater member does not contact the ink droplet deposited on the recording medium, and said heater member being arranged so that the distance between said heater member and said conveying mechanism decreases from said first heating section to said second heating section, wherein the temperature at said first heating section is within a range of 50° C.–70° C. and the temperature at said second heating section is within a range of 160° C.–200° C.

5. An apparatus according to claim 4, wherein said first heating section comprises at least an insertion port through which the recording medium is inserted and said second heating section comprises at least an exhausting port through which the recording medium is exhausted, and wherein a height of said insertion port is greater than the height of the ink droplet on the recording medium and a height of said exhausting port is smaller than the height of said insertion port and greater than the height of the ink droplet on the recording medium.

6. An apparatus according to claim 4, wherein said ink jet recording head comprises an electrothermal converting element and an ink discharge port through which ink is discharged onto the recording medium by thermal energy generated by said electrothermal converting element.

7. A fixing method to be applied to an ink jet recording apparatus, for heating a recording medium deposited with an ink droplet discharged through an ink jet recording head and fixing the ink droplet, said method comprising:

a first heating step for heating the recording medium at a first heating area to a temperature which is not sufficient to completely fix the ink droplet on the recording medium but promotes the fixation of the ink droplet;

a second heating step for heating the recording medium heated in said first heating step at a second heating area at a temperature higher than the temperature of the recording medium at the first heating step to completely dry the ink droplet deposited on the recording medium; and a conveying step of conveying the recording medium from an area where the ink jet recording head is disposed to the first heating area for effecting said first heating step and to the second heating area for effecting said second heating step, wherein said first heating step and said second heating step are effected with a heater member disposed in the first heating area and the second heating area, a distance between the recording medium and the heater member at an inlet side of the first heating area being such that the heater member is not in contact with ink deposited on the recording medium, the heater member being arranged facing a surface of the recording medium on which the ink droplet is deposited so that the heater member approaches the recording medium as the recording medium is conveyed from the inlet side of the first heating area to an outlet side of the second heating area.

8. A method according to claim 7, wherein the ink jet recording head comprises an electrothermal converting element and an ink discharge port through which ink is discharged onto the recording medium by thermal energy generated by the electrothermal converting element.

9. A fixing device for an ink jet recording apparatus, for heating a recording medium deposited with an ink droplet discharged through an ink jet recording head and fixing the ink droplet, said device comprising:

a heater member, said heater member including a first heating section for heating the recording medium to a temperature which is not sufficient to completely fix the ink droplet on the recording medium but promotes fixation of the ink droplet, and a second heating section for heating the recording medium heated at said first heating section to a temperature which is sufficient to completely dry the ink droplet deposited on the recording medium, the temperature at said second heating section being higher than the temperature at said first heating section; and a conveying mechanism, said conveying mechanism arranged to move the recording medium from an area where the ink jet recording head is disposed, through said first heating section and said second heating section, wherein said heater member further includes a heat dissipating member, said heat dissipating member being disposed facing a surface of the recording medium on which ink is deposited so that a distance between said conveying mechanism and said heat dissipating member at an inlet side of said first heating section is such that said heat dissipating member does not contact the ink droplet deposited on the recording medium, and said heat dissipating member being arranged so that the distance between said heat dissipating member and said conveying member decreases from said first heating section to said second heating section, wherein the temperature at said first heating section is within a range of 50° C.–70° C. and the temperature at said second heating section is within a range of 160° C.–200° C.

10. A device according to claim 9, wherein said ink jet recording head comprises an electrothermal converting element and an ink discharge port through which ink is discharged onto the recording medium by thermal energy generated by said electrothermal converting element.

11. An ink jet recording apparatus having a fixing device for heating a recording medium deposited with an ink droplet and fixing the ink droplet, said apparatus comprising:

an ink jet recording head disposed at a recording area for recording an image on the recording medium at the recording area by discharging ink on the recording medium;

a heater member including a first heating section for heating the recording medium to a temperature which is not sufficient to completely fix the ink droplet on the recording medium but promotes fixation of the ink droplet, and a second heating section for heating the recording medium heated at said first heating section to a temperature which is sufficient to completely dry the ink droplet deposited on the recording medium, the temperature of said second heating section being higher than the temperature at said first heating section; and a conveying mechanism, said conveying mechanism arranged to move the recording medium from the recording area, through said first heating section and said second heating section, wherein said heater member further includes a heat dissipating member, said heat dissipating member being disposed facing a surface of the recording medium on which ink is deposited so that a distance between said conveying mechanism and said heat dissipating member at an inlet side of said first heating section is such that said heat dissipating member does not contact the ink droplet deposited on the recording medium, and said heat dissipating member being arranged so that the distance between said heat dissipating member and said conveying member decreases from said first heating section to said second heating section, wherein the temperature at said first heating section is within a range of 50° C.–70° C. and the temperature at said second heating section is within a range of 160° C.–200° C.

12. An apparatus according to claim 11, wherein said ink jet recording head comprises an electrothermal converting element and an ink discharge port through which ink is discharged onto the recording medium by thermal energy generated by said electrothermal converting element.

13. A fixing method to be applied to an ink jet recording apparatus, for heating a recording medium deposited with an ink droplet discharged through an ink jet recording head and fixing the ink droplet, said method comprising:

a first heating step for heating the recording medium at a first heating area to a temperature which is not sufficient to completely fix the ink droplet on the recording medium but promotes the fixation of the ink droplet;

a second heating step for heating the recording medium heated in said first heating step at a second heating area at a temperature higher than the temperature of the recording medium at the first heating step to completely dry the ink droplet deposited on the recording medium; and a conveying step of conveying the recording medium from an area where the ink jet recording head is disposed to the first heating area for effecting said first heating step and to the second heating area for effecting said second heating step, wherein said first heating step and said second heating step are effected with a heat dissipating member disposed in the first heating area and the second heating area, a distance between the recording medium and the heat dissipating member at an inlet side of the first heating area being such that the heat dissipating member is not in contact with ink deposited on the recording medium, the heat dissipating member being arranged facing a surface of the recording medium on which the ink droplet is deposited so that the heat dissipating member approaches the recording medium as the recording medium is conveyed from the inlet side of the first heating area to an outlet side of the second heating area.

14. A method according to claim 13, wherein the ink jet recording head comprises an electrothermal converting element and an ink discharge port through which ink is discharged onto the recording medium by thermal energy generated by the electrothermal converting element.

* * * * *

UNITED STATES PATENT AND TRADEMARK OFFICE

CERTIFICATE OF CORRECTION

PATENT NO. : 6,092,891 Page 1 of 1
DATED : July 25, 2000
INVENTOR(S) : Okubo et al.

It is certified that error appears in the above-identified patent and that said Letters Patent is hereby corrected as shown below:

<u>Title page,</u>
Item [56], References Cited, FOREIGN PATENT DOCUMENTS,
"1285352" should read -- 1-285352 --.
Item [57], ABSTRACT,
Line 1, "a ink" should read -- an ink --.

<u>Column 5,</u>
Line 66, "above described, but conversely not exceeding" should read -- described above, but on the other hand does not exceed --.

<u>Column 7,</u>
Line 1, "of" should read -- of the --.

<u>Column 9,</u>
Line 1, "not" should read -- not in --.
Line 34, "opposed" should read -- opposite --.
Line 44, "thee" should read -- the --.

<u>Column 11,</u>
Line 26, "this" should read -- the --.

Signed and Sealed this

Tenth Day of May, 2005

JON W. DUDAS
*Director of the United States Patent and Trademark Office*